(12) United States Patent
Kiparisova Taylor

(10) Patent No.: US 11,303,740 B2
(45) Date of Patent: Apr. 12, 2022

(54) TELEPHONE WITH ILLUMINATED FRAME

(71) Applicant: Ksenia Kiparisova Taylor, Hollywood, FL (US)

(72) Inventor: Ksenia Kiparisova Taylor, Hollywood, FL (US)

(*) Notice: Subject to any disclaimer, the term of this patent is extended or adjusted under 35 U.S.C. 154(b) by 0 days.

(21) Appl. No.: 17/097,759

(22) Filed: Nov. 13, 2020

(65) Prior Publication Data

US 2021/0084131 A1    Mar. 18, 2021

Related U.S. Application Data

(63) Continuation of application No. PCT/US2019/032197, filed on May 14, 2019.

(60) Provisional application No. 62/670,906, filed on May 14, 2018.

(51) Int. Cl.
*H04M 1/02* (2006.01)
*H04M 1/04* (2006.01)
*H04B 1/3888* (2015.01)
*A45C 13/04* (2006.01)

(52) U.S. Cl.
CPC .................. *H04M 1/026* (2013.01)

(58) Field of Classification Search
CPC .......... H04M 1/02; H04M 1/026; H04M 1/03; H04M 1/04; H04M 1/185; H04B 1/3827; H04B 1/3833; H04B 1/3888; A45C 13/04; A45C 15/00; A45C 15/06; A45C 2011/002; A45C 2011/003
See application file for complete search history.

(56) References Cited

U.S. PATENT DOCUMENTS

| | | | | |
|---|---|---|---|---|
| 9,467,190 | B1* | 10/2016 | Cramer | H04B 1/3888 |
| 9,472,917 | B2* | 10/2016 | Jarvis | H04M 1/026 |
| 9,578,759 | B2* | 2/2017 | Seo | H04M 1/0202 |
| 9,992,884 | B2* | 6/2018 | Williams | H04B 1/3888 |
| 10,708,403 | B2* | 7/2020 | Mody | H04M 1/185 |
| 2007/0184781 | A1* | 8/2007 | Huskinson | H04M 1/0283 455/42 |
| 2011/0192857 | A1 | 8/2011 | Rothbaum et al. | |
| 2018/0320859 | A1* | 11/2018 | Philip | A45C 15/06 |

FOREIGN PATENT DOCUMENTS

CN    204069061 U    12/2014
KR    10-2006-01 15681 A    11/2006

OTHER PUBLICATIONS

International Search Report and Written Opinion dated Jul. 16, 2019 received in PCT/US2019/032197.

* cited by examiner

*Primary Examiner* — Quochien B Vuong
(74) *Attorney, Agent, or Firm* — Howard M. Gitten; Lewis, Brisbois, Bisgaard & Smith LLP

(57) ABSTRACT

A flexible frame element has a receiving curved surface which is concave to mate with and receive the curved surface of an object upon which it is to be applied. The frame element is substantially transparent and includes a phosphorescent layer along the concave curved surface. The frame element may include a flexible wire to provide structural integrity. The frame element is disposed along the phone body with the concave surface receiving the convex surface and the phosphorescent layer being disposed between the convex surface of the phone body and the concave surface of the frame element.

10 Claims, 5 Drawing Sheets

TELEPHONE WITH ILLUMINATED FRAME

CROSS REFERENCE TO RELATED APPLICATIONS

This application is filed under 35 U.S.C. 111(a) claiming priority under 35 U.S.C. 120 to PCT Application No PCT/US2019/032197 filed on May 14, 2019 which claims the benefit of U.S. Provisional Application No. 62/670,906 filed on May 14, 2018. The entire contents of these applications are incorporated herein by reference in their entirety.

BACKGROUND OF THE INVENTION

The present invention is directed to a structure for illuminating a mobile telephone, or other chassis structure capable of being framed and more particularly, a flexible structure disposed on the phone body or cover, covered with a glow-in-the-dark substance, the flexible structure following the contour of the chassis structure, outlining the phone making it visible in the dark.

Mobile telephones, by way of example, have become ubiquitous in daily life. Users cannot be without them, even at night, even in the dark. When the mobile phone is resting, in a dark room, such as at night on a nightstand in a bedroom, it may still indicate an incoming text message or call. The owner of the mobile phone must often fumble in the dark reaching for the phone to determine who has sent the message, or who is calling to determine whether they wish to respond. However, prior art phones, particularly when lying face down, are difficult, if not impossible to see in the dark. As a result, the phone is often mistakenly knocked off the nightstand as the user fumbles to grab it, or precious time is wasted locating the phone causing the call to be missed.

Those structures which enable the phone to be seen at night, including the screen becoming energized with the receipt of an incoming call or text, require the phone to be on and a charged battery. This is not always the case, particularly in the middle of the night when the user is trying to sleep.

Additionally, it is desirable to see structures clearly at night, such as the outline of a vehicle chassis or signage. Often there is not a light or a power source to illuminate such structures. As a result, the structures may remain unseen in the dark causing a hazard.

Accordingly, a structure which makes a phone, or other chassis/body structure, visible in the dark which overcomes the shortcomings of the prior art by being carbon neutral while remaining reliable and climate and weather independent.

SUMMARY OF THE INVENTION

A flexible frame element has a receiving curved surface which is concave to mate with and receive the curved surface of an object upon which it is to be applied. The frame element is substantially transparent and includes a phosphorescent layer along the concave curved surface. The frame element may include a flexible wire to provide structural integrity. The frame element is disposed along the object with the concave surface receiving the convex surface and the phosphorescent layer being disposed between the convex surface of the phone body and the concave surface of the frame element.

In one embodiment of the invention a telephone has a phone body. The phone body has a curved surface which is convex relative to the phone body. The curved surface of the framed element receives and mates with the curved surface of the phone body.

BRIEF DESCRIPTION OF THE DRAWINGS

The present disclosure will be better understood by reading the written description with reference to the accompanying drawing figures in which like reference numerals denote similar structure and refer to like elements throughout in which.

DETAILED DESCRIPTION OF THE PREFERRED EMBODIMENTS

Figure 1:
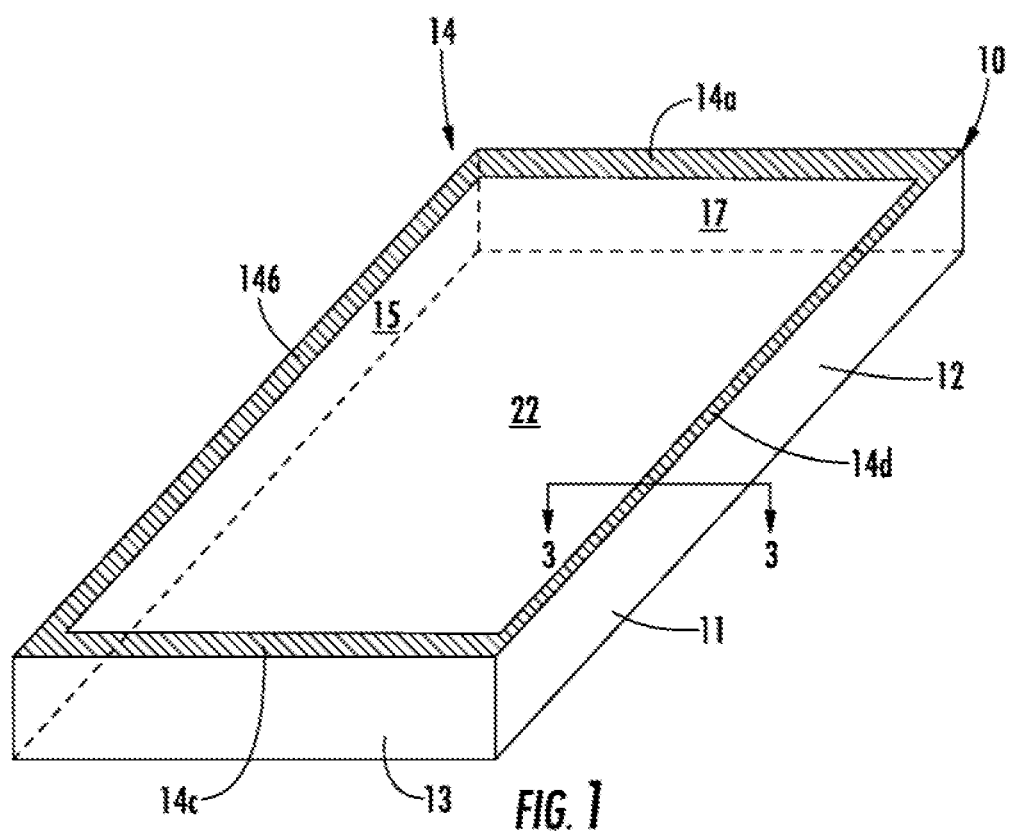
FIG. 1 is a front perspective view of a telephone constructed in accordance with the invention.

Reference is first made to FIG. 1 in which a phone 10, having a frame 14, constructed in accordance with the invention, is provided. For ease of description, only the housing 12 of phone 10 is shown. Housing 12 includes a back/floor 22 surrounded by sides 11, 13, 15 and 17 extending therefrom to form the enclosed housing 12 to contain the operational portions (not shown) of phone 10 as known in the art.

A frame element generally indicated as 14 is disposed on housing 12. In a preferred embodiment, frame element 14 is disposed along an outer front facing edge of housing 12 so as not to interfere with operation of phone 10. It will be understood, that frame element 14 may be disposed along a bottom or side surface of housing 12. Additionally, frame element 14 may be formed as a unitary structure, or formed as segments 14a-14d for ease of manufacture and construction and to increase the ability to accommodate any shape or size of housing 12.

Figure 2:
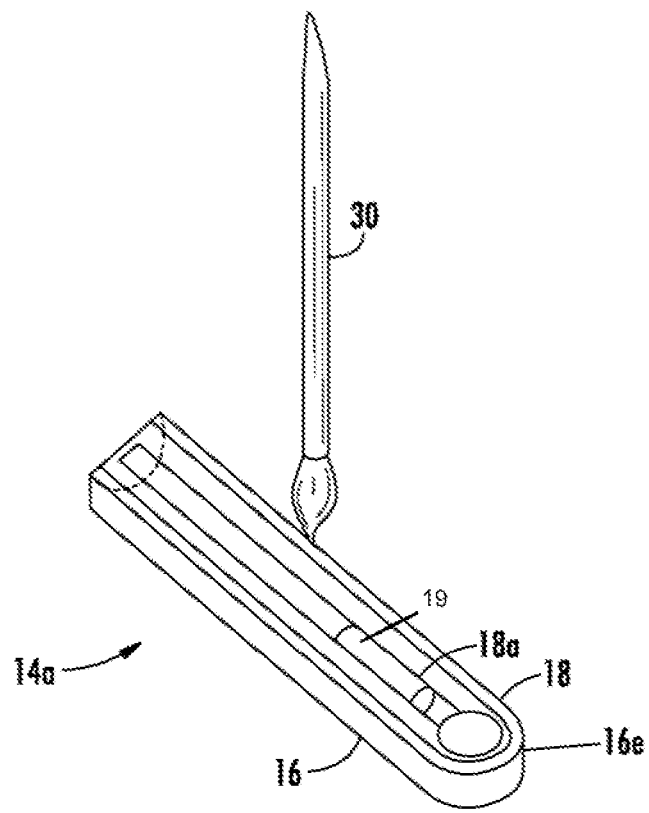
FIG. 2 is a bottom perspective view of a frame element constructed in accordance with the invention.
Figure 3:
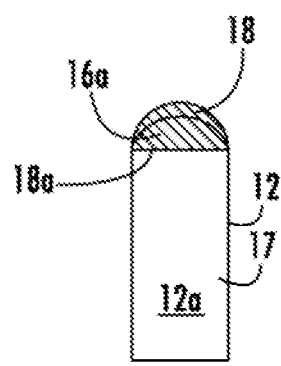
FIG. 3 is a sectional view taken along line 3-3 of FIG. 1.

Reference is now also made to FIGS. 2 and 3 in which the structure of frame element 14 is shown with greater particularity. Frame element 14 includes a transparent base member 16. In a preferred non-limiting embodiment, base member 16 includes a bottom surface 16a which is preferably concave. Base member 16 must be transparent and is preferably formed from a flexible material such as plastic. Flexible materials are preferred to prevent breakage during manufacture and use.

A layer 18 of a phosphorescent substance, preferably a chemical paint, is disposed along the surface 16a. In a preferred non-limiting embodiment, phosphorescent layer 18 has a bottom surface 18a shaped to receive a surface 12a of housing 12. In a preferred non-limiting embodiment surface 18a is concave to receive the convex surface 12a of housing 12. It is readily understood, that the shape of the respective surfaces 12a and 18a are formed so that one surface is received within the other to secure one surface to the other, as well as to maintain the look and feel of housing 12, as it would appear in the absence of frame element 14. Here the elements are formed to maintain the smooth rounded corners of phone 10. Other mating arrangements are within the scope of the invention including, housing 12 being formed with a concave surface to receive a convex surface of frame element 14. It should be noted, that while preferred, no surface mating is required as a flat frame 14 may be affixed to a flat surface of housing 12.

In a preferred non limiting embodiment, a wire 19 is disposed along the length of frame 14. Wire 19 is disposed at a bottom of concave surface 16a. In a preferred a non-limiting embodiment wire 19 is a flexible aluminum wire that is soldered to one of the base member 16 or phosphorescent layer 18 without interfering with the properties of the phosphorescent paint layer 18 on base member 16. Wire 19 is preferably flat (substantially rectangular in cross section) to maximize contact between frame 14 and housing 12. Wire 19 is sufficiently malleable so as to bend under manual pressure, but not sufficiently malleable to be bent by the restorative elastic forces of base member 16. Once bent, wire 19 holds its shape and the shape of base member 16 preventing return to the original shape until acted upon; acting as a backbone for the structure. This will allow wire 19 to be flexible and delineate any object to which it is attached.

In a preferred non-limiting embodiment, phosphorescent layer 18 is applied to base member 16 by painting a layer, schematically illustrated as a conventional brush 30, on to surface 16a. In a preferred non-limiting embodiment, layer 18 is a phosphorescent material made from a non-toxic strontium based paint. Such paints are durable and have a long effective life.

As a result the phosphorescent later 18 absorbs light energy when exposed to light such as sunlight during the day and returns the energy as an emitted light in a relatively dark environment. The paint of layer 18 may be sufficiently thin so as to conform to the shape of base element 16, as well as to be flexible to the same extent as base 16; able to flex with base 16 without substantial cracking or chipping of layer 18. Layer 18 is also sufficiently thick, so as to absorb sufficient amounts of light and sufficiently phosphoresce so as to be seen at a distance from phone 10. Wire 19 may be disposed between paint layer 18 and base element 16, or may be disposed upon paint layer 18 to come in contact with housing 12. In other words, phosphorescent layer 18 is applied over wire 19 in one embodiment.

The painted base 16 is then affixed to housing 12; by gluing, soldering or other methods known in the art which do not interfere with the qualities of the phosphorescent layer 18. Because the phosphorescent layer 18 is disposed between housing 12 and base 16, the phosphorescent layer is protected from contact with users; protecting the integrity of layer 18 while at the same time preventing any phosphorescent paint from smudging onto the user themselves.

Figure 4:
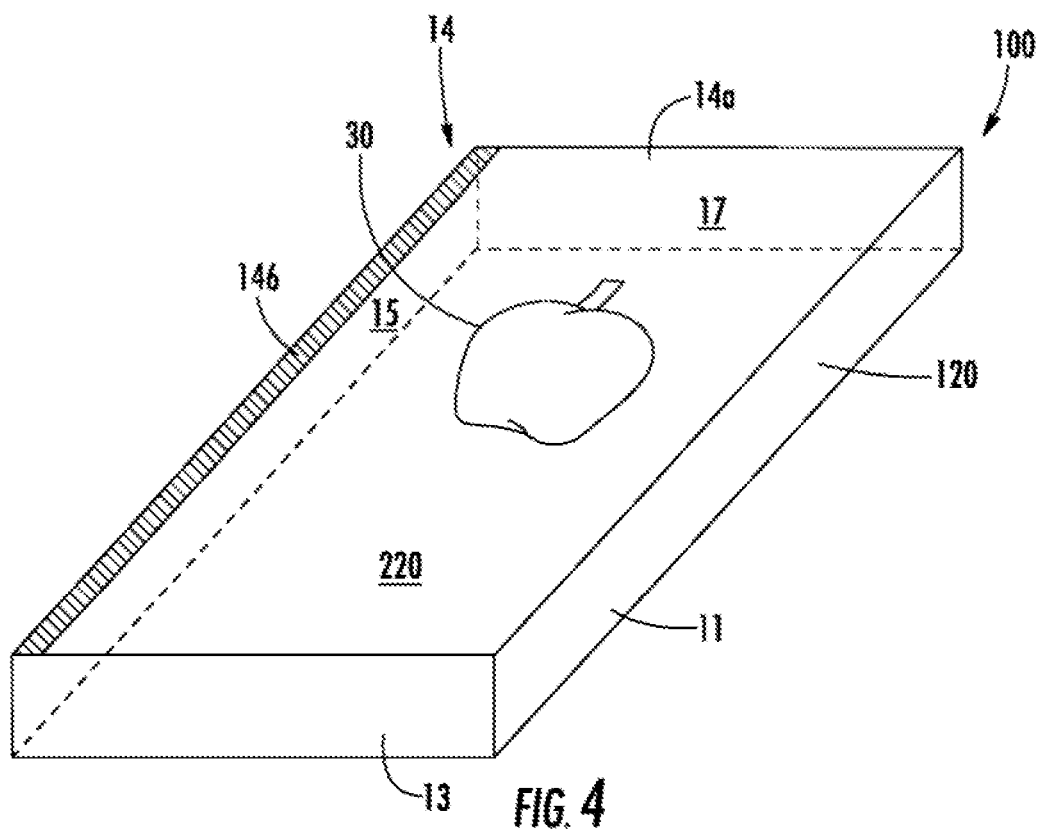
FIG. 4 is a front perspective view of a telephone constructed in accordance with a second embodiment of the invention.

Reference is now made to FIG. 4 in which a phone 100 constructed in accordance with another embodiment of the invention is provided. Like structure is indicated with like numerals. Phone 100 includes a housing 120 having a back/floor 220 surrounded by walls 11-17 extending from floor 220 to form housing 12 enclosing the operating portions (not shown) of phone 100. Floor 220 is formed of a transparent material such as plastic. A symbol 20, such as a corporate logo, or any fanciful design is disposed on an inwardly facing surface of floor 220. Symbol 20 is formed from the phosphorescent substance such as the phosphorescent paint discussed above. In this way, symbol 20 is visible through floor 220 while protected from coming in contact with users by floor 220 and the operating components of phone 100. This protects the integrity of symbol 20 from phone users, while protecting phone users from the phosphorescent substance comprising symbol 20.

It should be pointed out, that while the above embodiments were provided to illustrate the invention, it is well within the scope of the invention to provide an entire back 220 as a phosphorescent surface. Furthermore, the present invention is not limited to phones themselves, but may also be utilized in connection with phone casings, other electronic devices such as laptops, kitchen appliances, refrigerators, stoves, tablets or the like; each containing a phosphorescent frame element as described above delineating the shape and making the device visible the dark.

It is well understood, that mobile phones constructed in accordance with the invention will in effect glow-in-the-dark and be easily located, even when the phone is off. Devices constructed in accordance with the invention provide additional aesthetic value while enhancing safety so that one does not hurt themselves at night bumping into refrigerators or stoves, or knocking over portable devices as the contours of each device will be delineated making it easy to see and locate. By delineating phones, iPads, laptops and other electronic devices, fewer people forget phones in taxis and restaurants were seats are often made of leather, the same color as most phones, in a way that conventional phones are not seen relative to the background when leaving. Still another benefit of the invention is that it provides these benefits without requiring batteries or electricity, and utilizes natural daylight or indoor lighting as a source of energy for the phosphorescent effect making the device extremely mobile and versatile.

The present invention is not limited to phones and furniture as described above, but can also be utilized in connection with road signs, store signs, hotel signs, advertising signs, to make images visible even where no electricity is present. The structure is sufficiently flexible to delineate the letters themselves as it can trace the contour of every letter within the sign, making letters visible from afar; and the entire sign visible from a distance.

Figure 5:
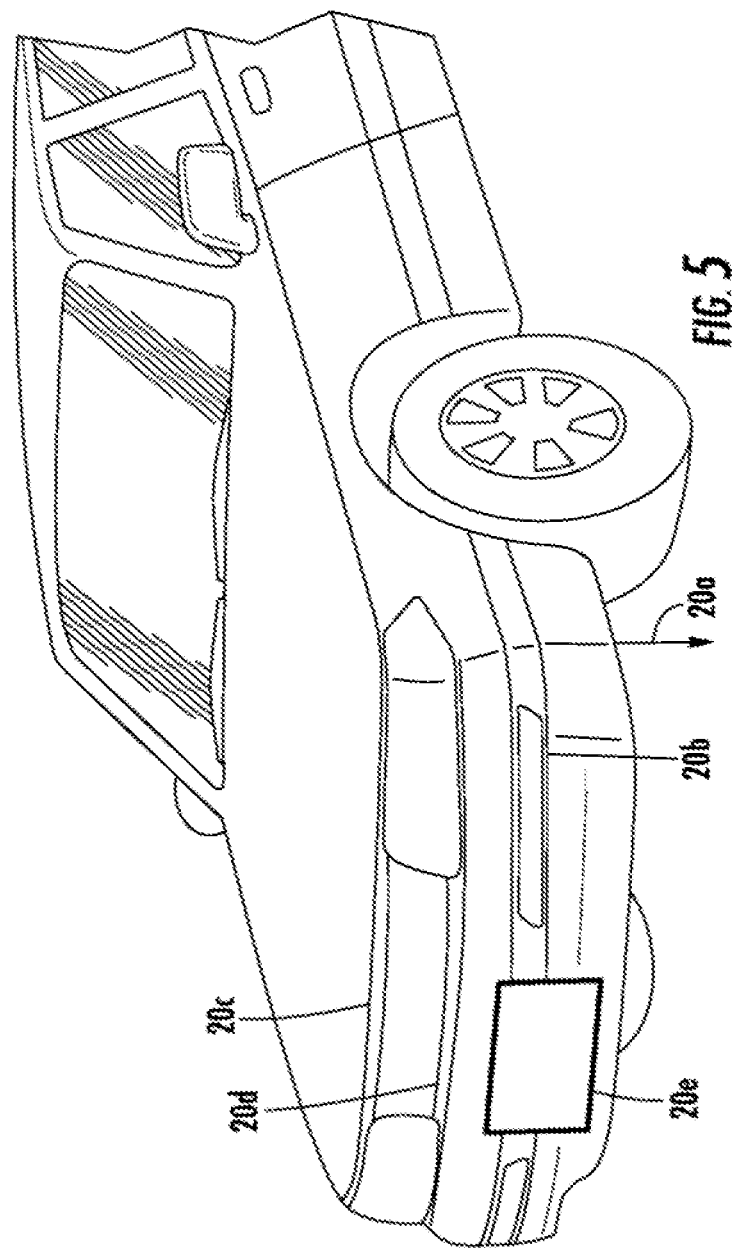
FIG. 5 is a front perspective view of a vehicle chassis constructed in accordance with a third embodiment of the invention.

In another embodiment, the frame element can be utilized with an automobile. A car, on the road with a broken tail light, or switch does not have its lights on; it can often be hard to make out. This condition poses a threat to traffic safety and can cause an unnecessary accident. Using a framing element 20, as shown in FIG. 5 can delineate the front and back of an automobile. By soldering the wire 19 in sections 20a, 20b, 20c, 20d, and 20e around the lights themselves, and the frame edges of the automobile, fellow drivers can more easily recognize the outline of the car. This can help prevent unnecessary accidents and injuries; making our roads safer.

Light is an electromagnetic energy which is carried out by elementary particles photons. The phosphorescent paint has an ability to absorb natural light during the day and exude light for a few hours in the dark, independently from electricity.

At times of bad weather and natural disasters (e.g. hurricanes, flooding) the electricity sources are often compromised or not available. The inventive assembly may be used to delineate hotel signs, gas station signs, store signs, etc. Because of its flexible structure the inventive assembly can follow the course of any sign or letter and serve as a backup for the Store (hotel, hospital, traffic signs, Airport signs) to be seen in the dark even if electricity is not available. Thus making it a safety feature for any business to have in case of bad weather. It can also be used along the landing strip for airplanes in case of emergencies.

Figure 6:
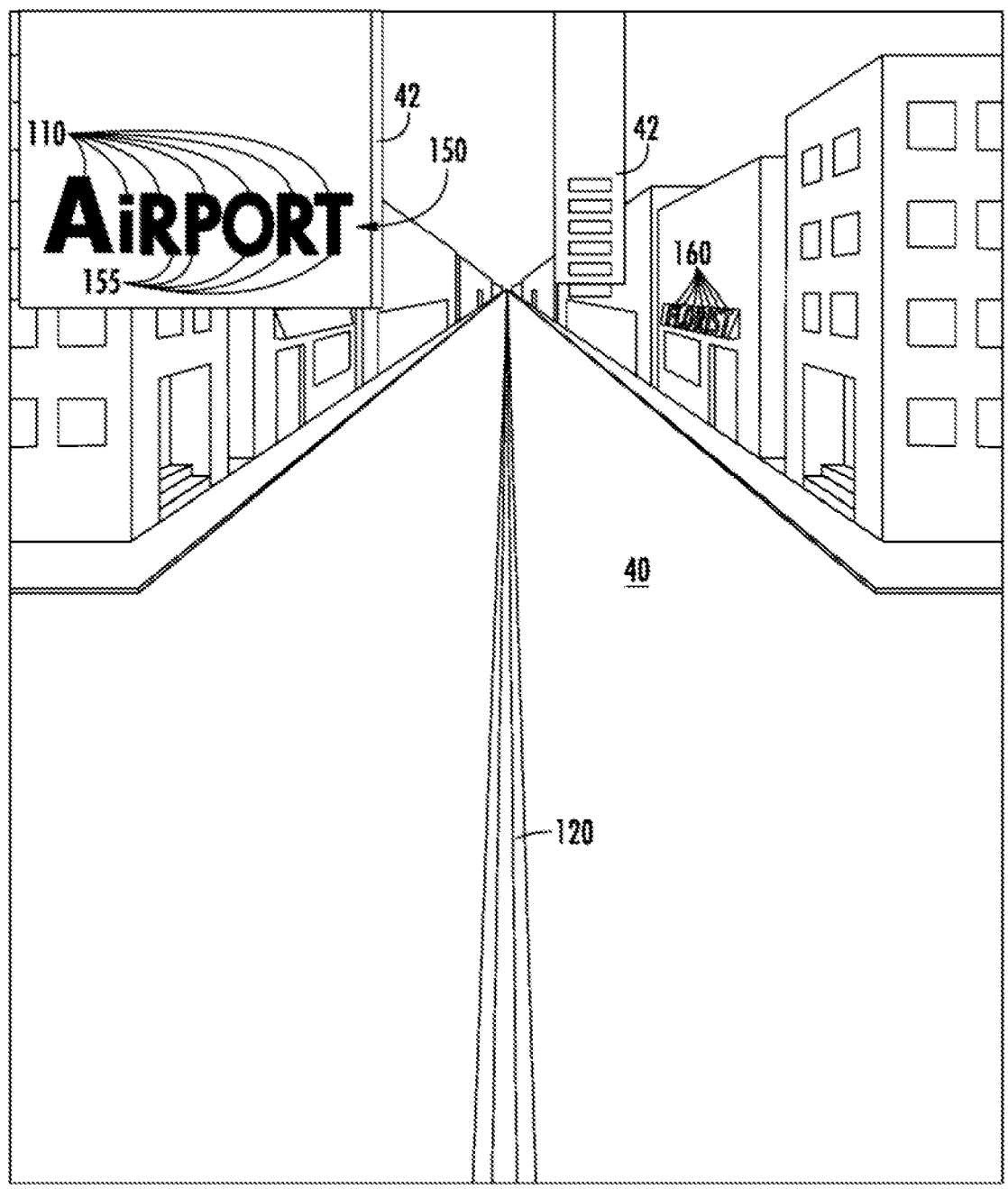
FIG. 6 is a schematic view of a roadway environment utilizing the invention to illuminate key aspects thereof.

Reference is now made to FIG. 6 in which a schematic scene of the inventive assembly used in a variety of ways in an environment is shown. A roadway 40 runs between buildings 42 on the way, in this example, to the airport. Roadway 40. Includes lane markers 120 formed from frame element 14 affixed to roadway 40. In this example roadway 40 leads to an airport. Airport signage 150 is affixed to a building 42. However, rather than being illuminated by light, each letter 155 of signage 150 is framed by an illuminated frame assembly 110 constructed in accordance with the invention. Because of the malleable nature of frame elements 110 constructed in a manner substantially identical to frame elements 14, frame element 110 can adapt to the contours of each letter 155 of signage 150. Lastly, the letters 160 of a storefront sign can be formed directly from the frame elements described above.

In this way, as each of the frames 110, stripe elements 120 and letters 160 absorb sunlight during the day, and project light at night making sign 150, roadway markings 120 and letters 160 visible Even in the absence of sunlight, the continuous exposure to headlights of vehicles passing the respective phosphorescent elements will cause them to be illuminated providing visible markers and signs providing information and safety aids without the need of additional electricity or dedicated wiring or the like.

The frame element 19, not only glows in the dark, but during the day, will not distract drivers, leaving the overall design impression as known to car designers; providing safety without ruining the original aesthetics of the car.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The invention claimed is:

1. A portable device comprising:
 a housing;
 a frame element disposed on the housing; the frame element including a malleable base element formed from a transparent material, a malleable wire disposed along a length of the frame element and a phosphorescent layer disposed on the base element so as to be visible therethrough, the phosphorescent layer being disposed between the base element and the housing.

2. The portable device of claim 1, wherein the base element has a bottom surface facing the housing, the phosphorescent layer being formed on the bottom surface; and the bottom surface being concave.

3. The portable device of claim 1, wherein the wire is sufficiently malleable to be bent under manual pressure, but not bent by a restorative elastic force of the frame element.

4. The portable device of claim 1, wherein the wire is affixed to one of the frame element and the phosphorescent layer.

5. The portable device of claim 1, wherein the portable device is a cellular phone.

6. The portable device of claim 1, wherein the base element has a bottom surface facing the housing, the phosphorescent layer being formed on the bottom surface; and the bottom surface being concave; and the wire being sufficiently malleable to be bent under manual pressure, but not bent by a restorative elastic force of the base element.

7. A frame element comprising:
 a malleable base element formed from a transparent material,
 a phosphorescent layer disposed on the malleable base element so as to be visible therethrough; and
 a malleable wire disposed a long a length of the malleable base element.

8. The frame element of claim 7, wherein the wire is sufficiently malleable to be bent under manual pressure, but not bent by a restorative elastic force of the malleable base element.

9. The frame element of claim 8, wherein the wire is affixed to one of the malleable base element and the phosphorescent layer.

10. The frame element of claim 7, wherein the malleable base element has a bottom surface facing a housing, the phosphorescent layer being formed on the bottom surface; and the bottom surface being concave.

* * * * *